United States Patent [19]

Nohren, Jr. et al.

[11] Patent Number: 4,986,901
[45] Date of Patent: Jan. 22, 1991

[54] BOTTLED WATER CAP WITH INDICATOR AND ADAPTOR

[75] Inventors: John Nohren, Jr.; Joseph H. Nohren, both of Clearwater, Fla.

[73] Assignee: Innova Pure Water Inc., Clearwater, Fla.

[21] Appl. No.: 478,470

[22] Filed: Feb. 12, 1990

[51] Int. Cl.$^5$ .......................................... B01D 35/143
[52] U.S. Cl. .................................. 210/85; 210/282; 210/232; 222/482
[58] Field of Search ................. 210/232, 282, 472, 85; 222/482, 478, 481, 482, 547, 564, 566, 568, 570, 575; 239/377, 524

[56] References Cited

U.S. PATENT DOCUMENTS

| | | | |
|---|---|---|---|
| 4,695,379 | 9/1987 | Nohren, Jr. et al. | 210/282 |
| 4,769,144 | 9/1988 | Nohren, Jr. | 210/282 |
| 4,895,648 | 1/1990 | Hankammer | 210/472 |

Primary Examiner—Richard V. Fisher
Assistant Examiner—Cynthia L. Nessler
Attorney, Agent, or Firm—Nixon & Vanderhye

[57] ABSTRACT

A detent and numerical indicia are associated with a cap for a water treatment apparatus to keep track of how many times a bottle in which the treatment apparatus is disposed has been filled and emptied, to provide for periodic replacement of the filter media. The treatment apparatus is for attachment to a bottle with an opening at a neck portion, and includes an elongated tube, a cartridge containing water treatment media connected to one end of the tube, and a cap for capping the other end of the tube. The cap includes a body having through-extending passages therein, and a top which is movable with respect to the body to selectively cover or uncover the passageways. A detent is associated with the cap body and the top for providing detented rotation of the top with respect to the body. Indicia are associated with the cap top and the cap body for indicating each detented position. Thirty-one Arabic numbered positions and another blank position may be provided as the indicia, cooperating with an arrow that is stationary. Each time the bottle is filled the cap top is rotated one position with respect to the body, and once the last indicia is indicated on the top, the filter is replaced. An adaptor connects the tube to the filter cartridge, and the adaptor can also include water treatment media.

21 Claims, 3 Drawing Sheets

BOTTLED WATER CAP WITH INDICATOR AND ADAPTOR

BACKGROUND AND SUMMARY OF THE INVENTION

The invention relates to a water treatment apparatus that is particularly desirable for removing contaminants in drinking water. The invention comprises an improvement on the commercially successfully water treatment apparatus as described in U.S. Pat. No. 4,769,144 (the disclosure of which is hereby incorporated by reference herein).

The water treatment apparatus described in the above-mentioned patent is very useful in removing contaminants from normal tap water. However one difficulty associated therewith is the necessity to remove the filter media at predetermined intervals in order to be sure that the water is being effectively treated. Also, it is typically restricted to the use of a single water treatment media associated therewith of a predetermined volume determined by the volume of the cartridge of the unit.

According to the present invention, various modifications of the successful product as described in the U.S. Pat. No. 4,769,144 are provided. According to the invention, an indicator means is provided associated with the unit that allows the user to keep track of how many times the bottle has been filled so that he/she will know when it is time to change the filter cartridge. Also, according to the invention an adaptor is provided for connecting the internal tube of the water treatment apparatus to the filter cartridge. The adaptor can have another —or additional—filter media associated therewith so that depending upon the particular water conditions at any given point in time in the user's area, he/she may decide to utilize additional or an additional type of water treatment media.

According to one aspect of the present invention water treatment apparatus for attachment to a bottle with an opening at a neck portion thereof is provided. The water treatment apparatus comprises the following elements: An elongated tube having first and second ends. Cartridge means containing water treatment media operatively connected to the tube second end. Cap means for capping the first end of the tube, and for cooperating with the bottle neck to position the apparatus in the bottle, the cap means comprising a body and a top; the body having means defining fluid passageways therein adjacent, but radially spaced from, the tube first end to allow flow of liquid therethrough; and the top movable with respect to the body to selectively cover or uncover the fluid passageways. Detent means associated with the cap body and the cap top for providing detented rotation of the cap top with respect to the cap body. And, indicia means associated with the cap top and the cap body for indicating each detented position of the top with respect to the body.

In one embodiment of the device set forth above, the cap top comprises a top plate and an elongated shaft extending concentrically from the plate, and the detent means comprises a plurality of nubs spaced circumferentially around the middle portion of the shaft, and means defining grooved passageways in the body, radially inwardly from the fluid passageways, having grooves cooperating with the shaft nubs. The grooves are elongated along the direction of elongation of the shaft so that the shaft may slide along its direction of elongation with respect to the body.

According to a second embodiment of the device described above, the cap top comprises a top plate, and the body includes a stationary element and a shaft which is reciprocal with respect to the stationary element but restrained against rotational movement with respect to the stationary element. The detent means acts between the top plate and the shaft. The indicia comprises numbers on the top plate and an indicator mark (e.g. arrow) on a top portion of the shaft which is visible when viewing the top plate.

According to another aspect of the present invention, a water treatment apparatus is provided which comprises: An elongated tube having first and second ends. Cartridge means containing water treatment media operatively connected to the tube second end. Cap means for capping the first end of the tube, and for cooperating with the bottle neck to position the apparatus in the bottle, the cap means comprising a body and a top; the body having means defining fluid passageways therein adjacent, but radially spaced from, the tube first end to allow flow of liquid therethrough; and the top movable with respect to the body to selectively cover or uncover the fluid passageways. And, adaptor means for connecting the second end of the tube to the cartridge means, the adaptor means also containing water treatment media. The adaptor means preferably comprises a tubular section having a first end with an interior cross-sectional area approximately equal to the exterior cross-sectional area of the elongated tube second end, and a second end having an exterior cross-sectional area approximately equal to the interior cross-sectional area of the cartridge means. The adaptor first and second ends each have an interference fit with the second end of the elongated tube, and the cartridge means, respectively. The adaptor preferably includes screen means disposed therein for retaining water treatment media within it.

According to yet another aspect of the present invention there is provided a method of treating tap water utilizing a bottle and a water treatment apparatus disposed in operative association with the bottle neck. The water treatment apparatus includes a replaceable cartridge with water treatment media. The method comprises the steps of: (a) Filling the bottle with tap water which flows through the cartridge to be treated. (b) When practicing step (a), rotating the cap top with respect to the cap body so that the cooperating indica thereon advance one unit. (c) Emptying the bottle with treated water during normal use. And (d), repeating steps (a)-(c) until a certain indicia is indicated, and when that indicia is indicated, replacing the cartridge, and turning the cap top so that the indicia is back at its first position.

It is the primary object of the present invention to provide for the simple and effective treatment of tap water or the like. This and other objects of the invention will become clear from an inspection of the detailed description of the invention, and from the appended claims.

DETAILED DESCRIPTION OF THE DRAWINGS

Figure 1:
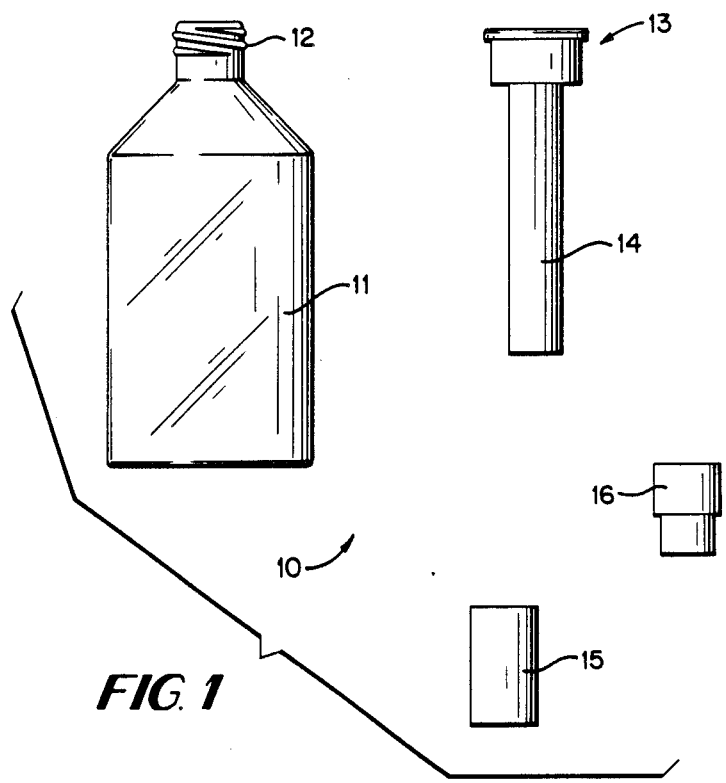
FIG. 1 is a side schematic exploded view illustrating a water treatment device according to the present invention, and a bottle with which it is adapted to be utilized.
Figure 2:
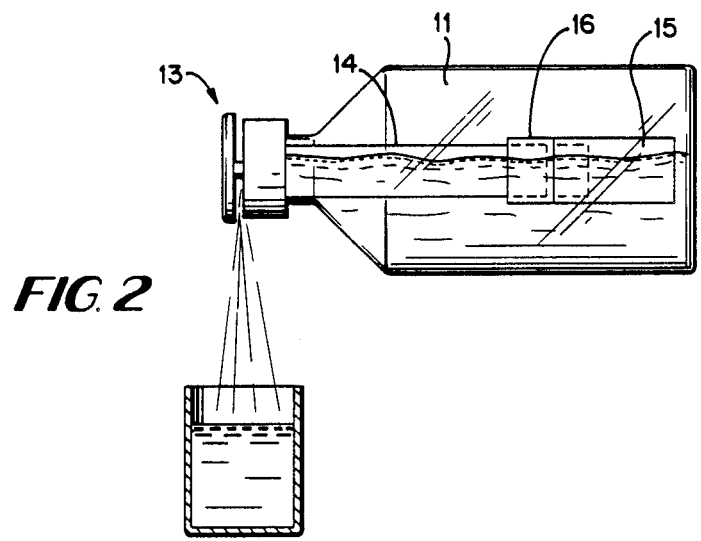
FIG. 2 is a view like that of FIG. 1 with the components assembled, and pouring treated water.

An exemplary device according to the invention is shown generally by reference numeral 10 in FIG. 1. The apparatus 10 is adapted to be utilized in association with a conventional container such as a bottle 11 which has a neck 12. As shown in said U.S. Pat. No. 4,769,144, the basic components include a cap means 13, an elongated tube 14, and cartridge means 15 containing water treatment media. The cap means 13 is connected, in use, to the first end of the tube 14, and the cartridge 15 to the second (lower) end of the tube 14. According to the invention the cartridge 15 is connected to the tube 14 by an adaptor 16. FIG. 1 shows the device 10 with the components separated from each other, while FIG. 2 shows the components assembled together with liquid (e.g. tap water) which has been introduced into the bottle 11 through the cartridge 15 being poured back out of the bottle 11.

Figure 3:
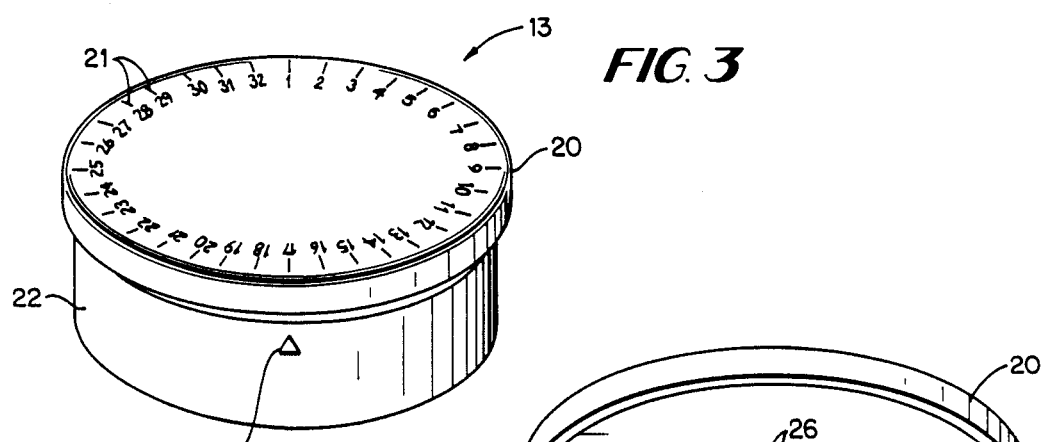
FIG. 3 is a top perspective view of the cap —with indicia thereon—of the device of FIG. 1.
Figure 4:
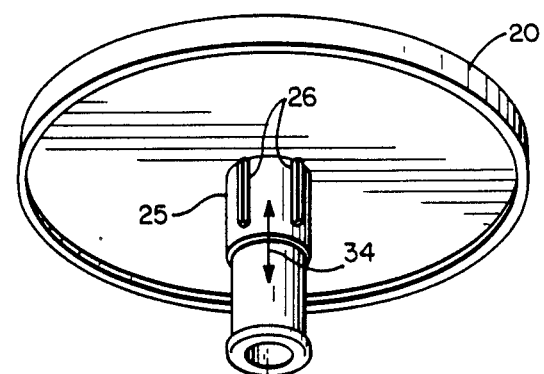
FIG. 4 is a bottom perspective exploded view of the cap of FIG. 3, with portions of the body cut away for clarity of illustration.
Figure 5:
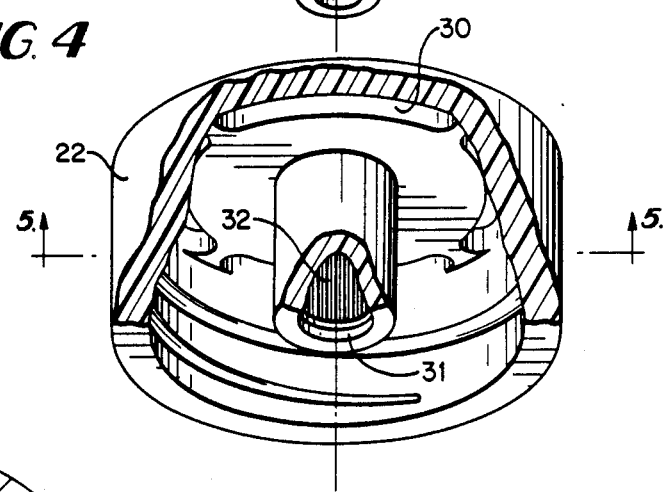
FIG. 5 is a cross-sectional view of the body of the cap, taken along lines 5—5 of FIG. 4.
Figure 5:
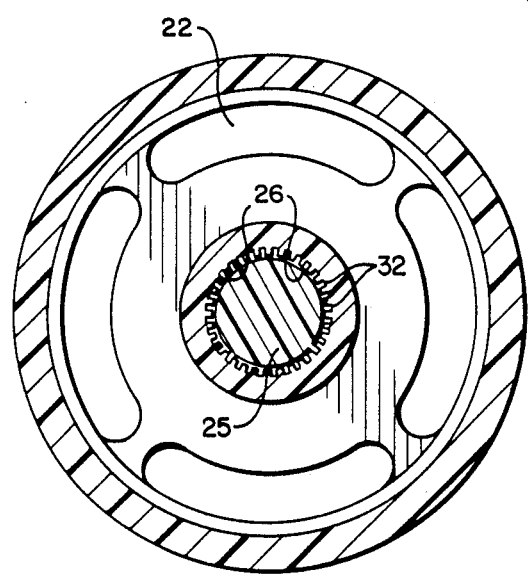

The cap means 13—as most clearly illustrated in FIGS. 3 through 5—comprises a body 22 and a top 20. The top 20 has indicia means associated therewith and for cooperating with other indicia 23 on the body 22. The indicia 21 preferably are Arabic numerals while the indicia 23 preferably is an arrow, or like clearly visible indicator. Also, detent means are associated with the cap body 22 and top 20 for providing detented rotation of the top 20 with respect to the body 22. The detent means are seen in FIGS. 4 and 5.

In the embodiment illustrated in FIGS. 3 through 5, the cap top plate 20 includes a shaft 25 (preferably hollow) depending from the bottom thereof, and concentric therewith, with nubs 26—or like detent projections—disposed circumferentially spaced around the tube 25. At the bottom of the tube 25 opposite the top 20 is a stop ring 27, preventing the shaft 25 from inadvertently being disconnected from the body 22.

The body 22 has means defining a plurality of through-extending fluid passageways 30 therein. As illustrated in the drawings the passageways 30 are preferably arcuate and radially spaced from a central bore 31 extending longitudinally through the body 22, and having an internal diameter slightly greater than the external diameter of the shaft 25. Means are provided defining a plurality of longitudinally extending grooves or notches 32 therein. The nubs 26 cooperate with the notches 32 to provide a detenting action, the material forming the cap body 22 and the nubs 26 typically being a plastic material which may be distorted slightly to allow detenting action when the cap top 20 is rotated with respect to the body 22. The grooves 32 are elongated in the direction of elongation of the shaft 25, and the shaft 25 has a length slightly greater than the height of the body 22, so as to allow relative movement of the cap top 20 with respect to the body 22 to selectively cover and uncover the passageways 30.

Figure 6:
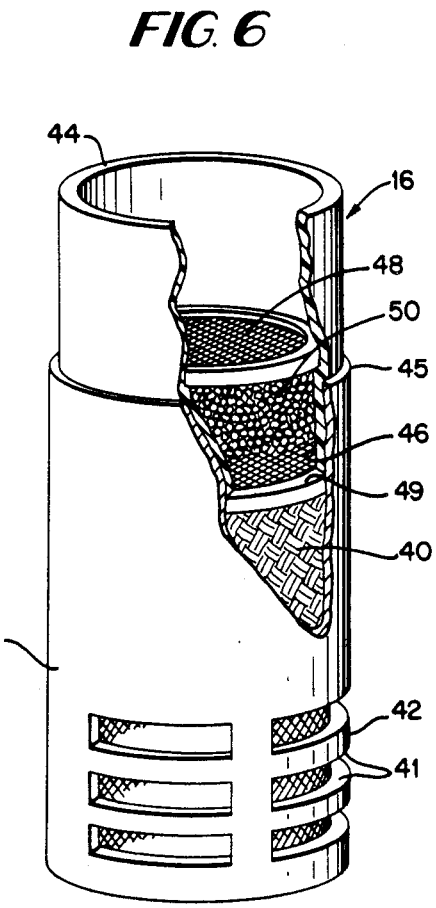
FIG. 6 is a perspective view, with portions cut away for clarity of illustration, of the adaptor and treatment cartridge of the device of FIG. 1.

The adaptor 16 according to the invention is shown in FIG. 6 in association with the cartridge 15. Water treatment media 40, such as activated charcoal particles, are provided in the cartridge 15, and typically means defining slits 41, with screens 42 holding the filter media within the cartridge 15, are provided at the bottom thereof to allow treated water to flow from the interior of the tubular passageway defined by the cartridge housing after treatment with the treatment media 40. Preferably a screen 49 is provided at the top of, but spaced interiorly from, the cartridge means 15 to hold the media 40 in place.

The adaptor 16 comprises a female end 44, a male end 46, and a ridge or transition 45 therebetween. The internal diameter of the female end 44 is slightly greater than the external diameter of the second end of the elongated tube 14, while the exterior diameter of the male end 46 is slightly less than the internal diameter of the cartridge 15. Therefore an interference fit is provided both between the female end 44 and the tube 14, and the male end 46 and the cartridge 15, with the cartridge 15 abutting the ridge 45. An internal screen means 48 is preferably provided at the ridge area 45, and filter media 50 may be provided between the screen 48 and the screen 43 associated with the cartridge 15. The additional water treatment media 50 may be an additional volume of the same media as the media 40 (e.g. activated charcoal), or it may be a different type of treatment media for treatment of particular impurities and contaminants expected to be found in the tap water with which the device 10 is utilized.

The adaptor 16 preferably is formed from plastic by injection molding. Likewise the components of the cap means 13 are preferably formed of plastic by injection molding of individual components.

Figure 7:
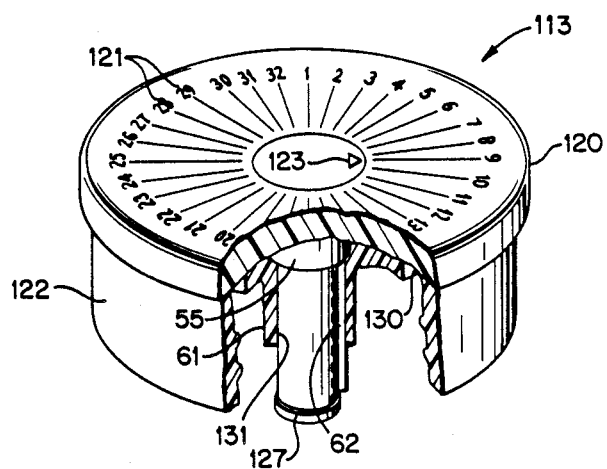
FIG. 7 is a top perspective view, partly in cross-section, showing a second embodiment of an indicator cap according to the invention.
Figure 8:
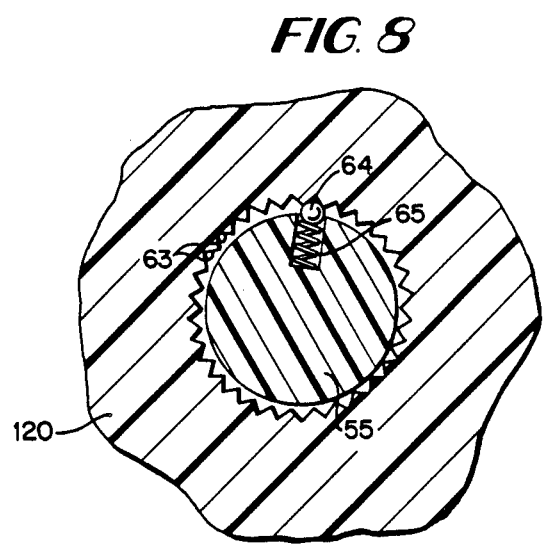
FIG. 8 is longitudinal cross-sectional view of the top most portion of the cap of the FIG. 7 embodiment.

FIGS. 7 and 8 illustrate an alternative embodiment of a cap means according to the invention. In the embodiment illustrated in FIGS. 7 and 8 the same components (functionally) as in the FIGS. 3 through 5 embodiment are illustrated by the same reference numeral only preceded by a "1".

In the FIGS. 7 and 8 embodiment, the main differences are the location and construction of the detent means associated therewith. In this construction, the cap plate 120 is formed as a distinct component from the shaft 55 (rather than integrally with a shaft as illustrated in the FIGS. 3 through 5 embodiment). The shaft 55 is adapted to slide longitudinally in the concentric sleeve 61 in the body 122, with the stop ring 127 cooperating with the sleeve 61. A key 62 is provided which cooperates with a keyway (not shown) in the body 122 and prevents rotational movement of the shaft 55 with respect to the body 122, while allowing limited (by the cap top plate 120 and the stop 127) reciprocation.

The detent means associated with the cap plate 120 are illustrated in FIG. 8. The interior opening of the cap plate 120, which receives the shaft 55 has a plurality of detent grooves 63 associated therewith. At least one spring pressed ball or projection 64 is provided, which may be pressed by coil spring 65 within the shaft 55, or by a plastic leaf or the like, into the groove 63. The force applied by the spring 65 is sufficient to retain the ball 64 within the groove 63, yet still allow relative rotation between the cap top 120 and the shaft 55. In this particular embodiment the indicia 121—which preferably are Arabic numerals —are provided around the periphery of the top surface of the cap 120, while the indicator arrow 123 that is stationary is associated with the shaft 55 at a top portion thereof.

In both the FIGS. 3 through 5 and FIGS. 7 and 8 embodiments, it is desirable to provide 32 detented positions, 31 of them indicated by numerals, and a blank position (or indicated by some other indicia such as "change filter" or the like). However the invention is not limited to any particular number of indicia, but rather the number of indicia will merely be dependent upon the particular treatment cartridge 15 and/or additional treatment media 50, provided.

Operation

Utilizing the structure illustrated in FIGS. 1 through 5, in assembly of the cap means 13 the shaft 25 free end, with the stop 27 thereon, is compressed and inserted through the opening 31 in the stationary element 22. After ring 27 passes through opening 31, the shaft expands and the ring 27 thereafter serves as a stop preventing detachment of the cap 20 from the body 22. The cap means 13 is placed on top of the tube 14, the adaptor 16 female end is placed on the second end of the tube 14 and the male end 46 thereof placed within the cartridge 15. The entire device 10 is then inserted in the bottle 11 in association with the neck 12 thereof.

The cap 13 is removed from the bottle (as by unscrewing) when it is desired to fill the bottle. The water enters the top of the tube 14 and flows through the filter media 50, 40 into the surrounding area of the bottle 11. Once the bottle 11 is full the cap 13 is screwed back on the bottle and is again in association with the first end of the tube 14. When the bottle 11 is tilted for pouring (see FIG. 2), the cap top 20 slides with respect to the body 22, allowing liquid to flow through the passageways 30 and out the area between the top 20 and the body 22.

Each time that the bottle 11 is filled, the user grasps the top plate 20 and rotates it one detent click with respect to the body 22, advancing one Arabic numeral of the indicia 21 with respect to the stationary pointer 23. This rotating action causes the nubs 26 to move to the next adjacent grooves 32. The grooves 32 allow reciprocation of the shaft 25 with respect to the body 22, while the nubs 26 are still retained in an appropriate detented position.

Once the number of the indicia 21 on top of the cap 20 is reached which indicates that the filter media should be changed, the user will detach the cartridge 15 and discard it, and insert a new cartridge 15 in its place. At this time the filter media 50 also likely will be changed, as by putting a new adaptor 16 in place, or merely changing the media 50 itself. Then the top plate 20 is rotated back to the "1" indicia 21, and the cycle is ready to be repeated.

It will thus be seen that according to the present invention a simple yet effective water treatment apparatus has been provided which allows for the utilization of additional or an additional type of water filter media, and which allows one to readily keep track of the number of fills through a cartridge to readily determine when the cartridge is to be replaced. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent apparatus and methods.

What is claimed is:

1. Water treatment apparatus for attachment to a bottle with an opening at a neck portion thereof, comprising:
    an elongated tube having first and second ends;
    cartridge means containing water treatment media operatively connected to said tube second end;
    cap means for capping the first end of said tube, and for cooperating with the bottle neck to position the apparatus in the bottle, said cap means comprising a body and a top; said body having means defining fluid passageways therein adjacent, but radially spaced from, said tube first end to allow flow of liquid therethrough; and said top movable with respect to said body to selectively cover or uncover said fluid passageways;
    detent means associated with said cap body and said cap top for providing detented rotation of said cap top with respect to said cap body; and
    indicia means associated with said cap top and said cap body for indicating each detented position of said top with respect to said body.

2. Apparatus as recited in claim 1 wherein said indicia means comprise Arabic numbers 1-32, and a thirty second position; and wherein said detent means includes 32 positions.

3. Apparatus as recited in claim 1 further comprising adaptor means for connecting said second end of said tube to said cartridge means, said adaptor means also containing treatment media.

4. Apparatus as recited in claim 3 wherein said adaptor means comprises a tubular section having a first end with an interior cross-sectional area approximately equal to the exterior cross sectional area of said elongated tube second end, and a second end having an exterior cross sectional area approximately equal to the interior cross sectional area of said cartridge means; so that said adaptor first and second ends each have an interference fit with the second end of said elongated tube, and said cartridge means, respectively.

5. Apparatus as recited in claim 1 wherein said cap top comprises: a top plate; and an elongated shaft extending concentrically from said plate; and wherein said detent means comprises a plurality of nubs spaced circumferentially around a middle portion of said shaft, and means defining a grooved passageway in said body, radially inwardly from said fluid passageways, having grooves cooperating with said shaft nubs.

6. Apparatus as recited in claim 5 wherein said grooves are elongated along the direction of elongation of said shaft, so that said shaft may slide along its direction of elongation with respect to said body.

7. Apparatus as recited in claim 5 further comprising adaptor means for connecting said second end of said tube to said cartridge means, said adaptor means also containing water treatment media.

8. Apparatus as recited in claim 7 wherein said adaptor means comprises a tubular section having a first end with an interior cross-sectional area approximately equal to the exterior cross sectional area of said elongated tube second end, and a second end having an exterior cross sectional area approximately equal to the interior cross sectional area of said cartridge means; so that said adaptor first and second ends each have an interference fit with the second end of said elongated tube, and said cartridge means, respectively.

9. Apparatus as recited in claim 5 wherein said indicia means comprise Arabic numerals on said cap top plate, and a position indicator on said body.

10. Apparatus as recited in claim 9 wherein said position indicator comprises an arrow.

11. Apparatus as recited in claim 10 further comprising adaptor means for connecting said second end of said tube to said cartridge means, said adaptor means also containing water treatment media.

12. Apparatus as recited in claim 1 wherein said cap top comprises a top plate, and wherein said body includes a stationary element and a shaft which is reciprocal with respect to said stationary element but restrained against rotational movement with respect to said stationary element.

13. Apparatus as recited in claim 12 wherein said detent means acts between said top plate and said shaft.

14. Apparatus as recited in claim 13 wherein said indicia means comprises numbers on said top plate and an indicator mark on a top portion of said shaft which is visible when viewing said top plate.

15. Apparatus as recited in claim 14 wherein said adaptor means comprises a tubular section having a first end with an interior cross-sectional area approximately equal to the exterior cross sectional area of said elongated tube second end, and a second end having an exterior cross sectional area approximately equal to the interior cross sectional area of said cartridge means; so that said adaptor first and second ends each have an interference fit with the second end of said elongated tube, and said cartridge means, respectively.

16. Apparatus as recited in claim 5 wherein said indicia means comprise Arabic numbers 1-32, and a thirty second position; and wherein said detent means include 32 positions.

17. Water treatment apparatus for attachment to a bottle with an opening at a neck portion thereof, comprising:
  an elongated tube having first and second ends;
  cartridge means containing water treatment media operatively connected to said tube second end;
  cap means for capping the first end of said tube, and for cooperating with the bottle neck to position the apparatus in the bottle, said cap means comprising a body and a top; said body having means defining fluid passageways therein adjacent, but radially spaced from, said tube first end to allow flow of liquid therethrough; and said top movable with respect to said body to selectively cover or uncover said fluid passageways; and
  adaptor means for connecting said second end of said tube to said cartridge means, said adaptor means also containing water treatment media.

18. Apparatus as recited in claim 17 wherein said adaptor means comprises a tubular section having a first end with an interior cross-sectional area approximately equal to the exterior cross sectional area of said elongated tube second end, and a second end having an exterior cross sectional area approximately equal to the interior cross sectional area of said cartridge means; so that said adaptor first and second ends each have an interference fit with the second end of said elongated tube, and said cartridge means, respectively.

19. Apparatus as recited in claim 18 wherein said adaptor means includes screen means disposed therein for retaining water treatment media therewithin.

20. Water treatment apparatus for attachment to a bottle with an opening at a neck portion thereof, comprising:
  an elongated tube having first and second ends;
  cartridge means containing water treatment media operatively connected to said tube second end;
  cap means for capping the first end of said tube, and for cooperating with the bottle neck to position the apparatus in the bottle, said cap means comprising a body and a top; said body having means defining fluid passageways therein adjacent, but radially spaced from, said tube first end to allow flow of liquid therethrough; and said top movable with respect to said body to selectively cover or uncover said fluid passageways;
  said cap top including an annular portion having a first set of indicia thereon, and a central portion having other indicia thereon;
  means for mounting said annular portion and said central portion together so that said central portion is rotatable with respect to said annular portion so that the indicia on said central portion and annular portion may be aligned in a plurality of different circumferentially spaced positions of the indicia on said central portion; and
  detent means between said cap central portion and said annular portion.

21. Apparatus as recited in claim 20 wherein the indicia provided on said cap central portion is an arrow, and wherein indicia provided on said annular portion includes Arabic numerals.

* * * * *